United States Patent [19]

Itoh et al.

[11] Patent Number: 5,238,492
[45] Date of Patent: Aug. 24, 1993

[54] PIGMENT AND PROCESS FOR PRODUCING THE SAME

[75] Inventors: Hiroshi Itoh, Ichinomiya; Yuji Tanaka, Toyota; Koji Kuroyanagi, Okazaki; Eiki Takeshima, Ichikawa; Kaoru Gonoi, Ichikawa; Takashi Shirokura, Ichikawa; Noriyuki Suzuki, Toyota, all of Japan

[73] Assignees: Toyota Jidosha Kabushiki Kaisha; Nisshin Steel Co., Ltd., both of Japan

[21] Appl. No.: 785,328

[22] Filed: Nov. 1, 1991

[30] Foreign Application Priority Data

Nov. 2, 1990 [JP] Japan .................... 2-295524
Feb. 22, 1991 [JP] Japan .................... 3-50834
Feb. 22, 1991 [JP] Japan .................... 3-50835
Aug. 9, 1991 [JP] Japan .................... 3-200573

[51] Int. Cl.$^5$ .............................................. C04B 14/00
[52] U.S. Cl. ................................. 106/436; 106/441; 106/453
[58] Field of Search ................ 106/417, 436, 441, 453

[56] References Cited

U.S. PATENT DOCUMENTS 4,954,175 9/1990 Ito et al. ...................... 106/417
4,954,176 9/1990 Minohara et al. ............. 106/417
4,979,991 12/1990 Handa et al. .................. 106/417

FOREIGN PATENT DOCUMENTS

0313281A3 4/1989 European Pat. Off.
0351932A1 1/1990 European Pat. Off.
57-161055 10/1982 Japan .
63-197638 8/1988 Japan .
1-104673 4/1989 Japan .
1-108267 4/1989 Japan .
2011935A 7/1979 United Kingdom .

OTHER PUBLICATIONS

"Patent Abstracts of Japan", unexamined applications, C Field, vol. 14 No. 188 (C 710) (4131), Apr. 17, 1990, The Patent Office Japanese Government, p. 44 C 710, Kokai-no. 2-32170, Feb. 1, 1990.
European Search Report.

Primary Examiner—Karl Group
Assistant Examiner—Chris Gallo
Attorney, Agent, or Firm—Finnegan, Henderson, Farabow, Garrett & Dunner

[57] ABSTRACT

Disclosed are a pigment, a production process therefor, a production process therefor and for improving its weather resistance, and a metallic paint made therefrom. The pigment includes a transparent or semi-transparent scaly substrate, a $TiO_2$ layer coated on an entire surface of the substrate, light absorbing portions formed on a surface of the $TiO_2$ layer in a scattering manner and including low order oxides of titanium, and glossy portions formed on a surface of the $TiO_2$ layer in a scattering manner and having a metallic glossy effect. The pigment produces a metallic glossy effect resulting from the glossy portions, strong interference colors resulting from the $TiO_2$ layer and substance colors resulting from the light absorbing portions, and it exhibits a great covering power. Such an excellent pigment can be obtained by the production process in which sputtering is carried out onto a conventional pearl mica pigment, and its weather resistance can be improved by the production process in which chromium (III) hydroxide is repeatedly coated on a conventional pearl mica pigment before and after the sputtering. When the metallic paint is made from the pigment, it naturally has the metallic glossy effect, the strong interference colors, the substance colors and the great covering power all of which result from the pigment and is suitable for an automobile top coat paint.

37 Claims, 8 Drawing Sheets

F I G. 7
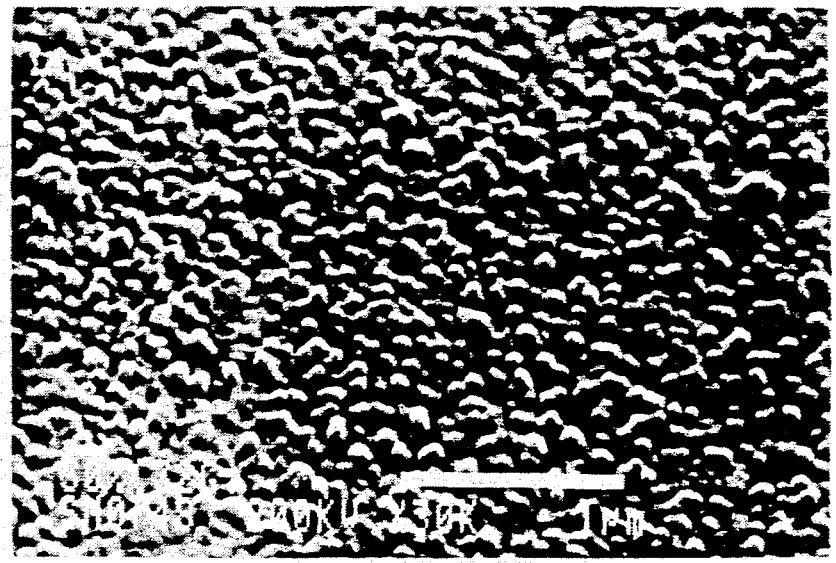

PIGMENT AND PROCESS FOR PRODUCING THE SAME

BACKGROUND OF THE INVENTION

1. Field of the Invention

The present invention relates to a novel pigment which is employed in a coloring agent for a paint, a plastic, a cosmetic or the like, and a process for producing the same.

2. Description of the Related Art

A pearl mica pigment, for instance, has been known which is employed in a top coat paint for an automobile. This pearl mica pigment has a construction in which $TiO_2$ is coated on the entire surface of mica, and it is used in a decorative painting which utilizes the interference colors resulting from the high refractive index of the $TiO_2$.

The pearl mica pigment produces a variety of interference colors through the thickness variation of the $TiO_2$ layer formed on the surface of the mica. When the $TiO_2$ is coated in an amount of from 26 to 40% by weight with respect to the product, the pearl mica pigment produces gold. When the amount is from 40 to 50% by weight, it varies to produce red, blue and green as the thickness of the $TiO_2$ layer increases. When the amount is from 50 to 60% by weight, it produces strong interference colors.

Although the pearl mica pigment has the pearly glossy effect and a variety of the interference colors, it always looks like white in the appearance. Hence, no pearl mica pigment has been available which produces a vivid color in the appearance.

Consequently, colored pigments such as iron oxide, iron blue, chromium oxide and carbon black have been added to the pearl mica pigment so as to attain a variety of colors in the appearance. However, when a plurality of these colored pigments are mixed to use, the inherent pearly glossy effect and interference colors of the pearl mica pigment are impaired, thereby deteriorating the decorativeness.

Therefore, the pearl mica pigment has been investigated in order to improve its decorativeness, and the following 3 representative methods have been reported so far: Japanese Unexamined Patent Publication (KOKAI) No. 19,666/1986, Japanese Unexamined Patent Publication (KOKAI) No. 164,653/1983, and Japanese Unexamined Patent Publication (KOKAI) No. 212,422/1984.

However, the method disclosed in Japanese Unexamined Patent Publication (KOKAI) No. 19,666/1986 has a problem that it can produce only red and black pearl mica pigments. The method disclosed in Japanese Unexamined Patent Publication (KOKAI) No. 164,653/1983 has a problem that it can produce only blue, bluish black, black and brownish black pearl mica pigments.

The method disclosed in Japanese Unexamined Patent Publication (KOKAI) No. 212,422/1984 can color the pearl mica pigment in blue, green, gold, reddish purple. However, in this method, the pearl mica pigment should be heated and reduced in a hydrogen gas atmosphere at a high temperature of from 500° to 1,000° C. Since the thickness of the $TiO_2$ layer is extremely thin, there is an anxiety for reducing the entire $TiO_2$ layer when reducing at the high temperature of from 500° to 1,000° C. Accordingly, it is hard to control a component ratio of titanium with respect to oxygen in a particle diameter direction of the mica or the thickness-wise direction of the $TiO_2$ layer. In addition, since the particles of the pearl mica pigments are sintered to aggregate and solidify at the high temperature, no fine powder pigment which is dispersed into its primary particles can be obtained. Hence, it is necessary to employ a special apparatus in order to maintain the powder state.

One might think of forming a titanium oxide layer on the mica particles themselves by sputtering titanium in an oxygen gas stream under decompression. However, the oxygen reacts with the titanium target to oxidize the target, and the sputterability through an oxygen gas is considerably small when compared with those through an argon gas and a helium gas. Hence, such a method is not practical. In addition, it is extremely hard to control the component ratio of titanium with respect to oxygen in the particle diameter direction of the mica or the thickness-wise direction of the $TiO_2$ layer.

However, the pearl mica pigment is poor in the covering power and the metallic glossy effect. Accordingly, there have been proposed a variety of improved versions.

For example, Japanese Unexamined Patent Publication No. 161,055/1982 (KOKAI) discloses a pigment which includes a metallic coating layer formed on the entire surface of mica by plating.

Japanese Unexamined Patent Publication (KOKAI) No. 108,267/1989 which was applied by the present applicants discloses a pigment which includes metallic glossy dots formed on the surface of a pearl mica pigment in a scattering manner.

A pigment is commercially available from Shiseido Co., Ltd. under a trade name of "Infinite Color." The pigment includes a layer of oxides of titanium exhibiting low orders of oxidation states (hereinafter simply referred to as "low order oxides of titanium") which are formed on the entire surface of mica, and a $TiO_2$ layer which is further formed on the entire surface of the layer of the low order oxides of titanium.

The pigment disclosed in Japanese Unexamined Patent Publication (KOKAI) No. 161,055/1982 has a sharp metallic glossy effect because the entire surface of the mica is covered with the plated metal. However, it does not produce interference colors. Accordingly, it does not produce no deep effect.

The pigment disclosed in Japanese Unexamined Patent Publication (KOKAI) No. 108,267/1989 operates through the reflection of the metal and scattering as well as the interference of the $TiO_2$, and it produces both the interference colors and the metallic glossy effect. However, it produces the interference colors in an insufficient strength.

The commercially available "Infinite Color" produces the interference colors in a strength in a certain degree. However, it suffers from the insufficient metallic glossy effect and covering power.

Further, a metallic paint has been used widely in a top coat paint for an automobile. This metallic paint contains a foil-like aluminum powder. The metallic paint is favorable because of its high covering power. However, it is hard to make a metallic paint which produces a light color because the aluminum does not have such a high brightness.

Hence, a metallic paint comprising the pearl mica pigment which includes the $TiO_2$ layer formed on the surface of the mica has been developed recently, and it is employed in practical applications. This metallic paint produces the pearly glossiness resulting from the mica as well as the interference colors resulting from the high refractive index of the $TiO_2$. Even when the paint color is a light one, the metallic paint produces a glossy metallic effect in the appearance.

However, the metallic paint comprising the pearl mica pigment lacks the covering power, and it is often hard to carry out painting with the metallic paint under the two-coat-one-bake system, the current automobile painting process. In addition, the thus obtained paint film suffers from an insufficient metallic glossy effect when it is viewed in an oblique direction (i.e., in a shade direction).

Japanese Unexamined Patent Publication (KOKAI) No. 104,673/1989 discloses a metallic paint comprising a pigment in which a glossy metal is deposited on a part of a mica surface. This metallic paint, however, produces a metallic glossy effect only, and it is insufficient in the decorativeness.

The present applicants applied for a patent under Japanese Unexamined Patent Publication (KOKAI) No. 108,267/1989. The publication discloses a pigment which improves the above-mentioned shortcomings. The pigment includes metallic glossy dots which are formed on a surface of a pearl mica pigment in a scattering manner. A metallic paint comprising this pigment produces an enhanced metallic glossy effect when viewed in an oblique direction (i.e., in a shade direction), and it exhibits an improved covering power. However, the covering power and the interference colors of the metallic paint are still insufficient. Accordingly, there has been longed for a further improvement in the metallic paint.

Moreover, it is required for an automobile paint or the like, which is to be painted on an external metal surface particularly, to have an excellent weather resistance which enables the appearance of the paint not to change as long as a few years substantially though the paint is exposed to various weather conditions. This weather resistance is not only affected by the weather resistance of its resin components as a matrix, but also it is greatly affected by a pigment which are contained in the paint.

There have been proposed a variety of methods for improving the weather resistance of a $TiO_2$ pigment which has been used widely as a white pigment.

For example, in U.S. Pat. No. 2,242,320, chromium naphthenate is used as a covering material for a surface of the $TiO_2$ pigment.

In U.S. Pat. No. 2,242,322, in order to improve the resistance against the chalking and discoloring, the $TiO_2$ pigment is colored by combining 0.5% of chromium in a form of oxides, 2.0% of zirconium silicate and 1.0% of alumina on the calcined $TiO_2$ pigment.

In U.S. Pat. Nos. 2,226,142 and 2,062,137, chromium compounds are added to the $TiO_2$ pigment in order to improve the weather resistance before calcining it.

In U.S. Pat. No. 2,045,836, $TiO_2$ is precipitated in the presence of a chromic acid so as to generate the $TiO_2$ pigment which includes chromate ions, thereby improving the weather resistance.

In U.S. Pat. No. 2,231,268, a pigment production process is disclosed. The production process includes a preparing step of preparing calcined $TiO_2$, which includes small amounts of aluminum (from 0.25 to 2% as $Al_2O_3$) and chromium (from 0.01 to 2% as $Cr_2O_3$), and a drying step.

However, the pearl mica pigment which includes the mica particles coated with the $TiO_2$ is a more complex substance than the simple $TiO_2$ pigment is. Hence, the methods or techniques employed for stabilizing the $TiO_2$ pigment are useless or insufficient to give the stability to the pearl mica pigment. This is because there occurs reactions at the boundaries between the mica and the $TiO_2$, and it is also because the $TiO_2$ itself reacts.

Hence, there have been proposed a variety of methods for improving the weather resistance of the pearl mica pigment.

For instance, West Germany Laid-Open Patent Publication No. 1,467,468 sets forth an advantageous effect of chromium hydroxide coating layer which is formed on mica covered with anatase type $TiO_2$.

West Germany Laid-Open Patent Publication No. 2,852,585 sets forth a similar advantageous effect of chromium hydroxide coating layer for mica which is covered with rutile type $TiO_2$.

The primary object of these two German patent publications is to obtain a transparent pearl mica pigment.

In Japanese Unexamined Patent Publication (KOKAI) No. 34,527/1972, a method is disclosed in which a pearl mica pigment is treated with methacrylate chromium (III) chloride. When the methacrylate chromium (III) chloride remains without being hydrolyzed substantially on the pearl mica pigment, there arises an advantageous effect of this treatment. The purpose of the treatment is said to give "an excellent resistance against varying conditions" to a coating film comprising this pigment, however, the advantageous effect is available only for the case where the coating film is exposed to moisture.

In Japanese Examined Patent Publication (KOKOKU) No. 3,345/1985, a pearl mica pigment is disclosed, and it is formed as follows. A thin $TiO_2$ film is precipitated on a mica surface, and thereafter $SnO_2$ and $TiO_2$ are coated thereon by turns in this order. After burning the thus coated mica at a temperature up to 1,000° C., it is further coated with an insoluble chromium compound, and it is burned again to form the rutile type $TiO_2$ on the mica surface.

Even when the conventional pearl mica pigment is mixed with various paints and plastics, it cannot be employed in practical applications because it has an insufficient weather resistance. Therefore, the present inventors carried out the chromium (III) oxide treatments on the outermost surface of the conventional pearl mica pigment in accordance with the above-mentioned related arts, i.e., West Germany Laid-Open Patent Publication No. 1,467,468, West Germany Laid-Open Patent Publication No. 2,852,585, Japanese Unexamined Patent Publication (KOKAI) No. 34,527/1972 and Japanese Examined Patent Publication (KOKOKU) No. 3,345/1985. However, the weather resistance of the conventional pearl mica pigment could not be improved at all.

SUMMARY OF THE INVENTION

It is a primary object of the present invention to provide a novel pearl mica pigment which produces the interference colors and the metallic glossy effect in sufficient strengths and to increase the covering power of the pearl mica pigment.

It is a secondary object of the present invention to provide a production process which enables to produce the novel pearl mica pigment in a variety of colors with ease.

It is a tertiary object of the present invention to provide a metallic paint which comprises the novel pearl mica pigment and which produces the interference colors and the metallic glossy effect in sufficient strengths and to increase the covering power of the metallic paint.

It is a quaternary object of the present invention to improve the weather resistance of the novel pearl mica pigment.

The present inventors have made research and development in order to improve the strengths of the interference colors and the covering power of the pigment which is disclosed in Japanese Patent Publication (KOKAI) No. 108,267/1989. As a result, a first aspect of the present invention has been completed. Namely, there is provided a pigment according to the first aspect of the present invention which comprises:

a transparent or semi-transparent scaly substrate;
a $TiO_2$ layer coated on an entire surface of the substrate;
light absorbing portions formed on a surface of the $TiO_2$ layer in a scattering manner and including low order oxides of titanium; and
glossy portions formed on a surface of the $TiO_2$ layer in a scattering manner and having a metallic glossy effect.

The substrate is a base of the present pigment. A transparent or semi-transparent scaly one such as mica, glass foil, molybdenum disulfide, $Fe_2O_3$, MIO or the like can be employed as the substrate. It is especially preferred to employ the mica which is produced in a scaly crystalline substance naturally. It is also possible to employ natural mica such as muscovite, biotite, phlogopite or the like and synthetic mica.

The substrate ordinarily has a length of from 1 to 75 micrometers, preferably from 5 to 40 micrometers, and it ordinarily has a thickness of from 0.03 to 0.3 micrometers, preferably from 0.10 to 1.0 micrometers. In addition, the substrate ordinarily has a specific surface of from 1 to 10 $m^2/g$, preferably from 2 to 6 $m^2/g$, which is determined by the BET equation.

The $TiO_2$ layer is identical with that of the conventional pearl mica pigment, and it is coated on the entire surface of the substrate. Depending on a thickness of the $TiO_2$ layer, the pigment can produce the interference colors in a variety of hues.

One of the major features of the present pigment is that it includes the light absorbing portions and glossy portions which are formed on the surface of the $TiO_2$ layer in a scattering manner. The light absorbing portions include low order oxides of titanium. The low order oxides of titanium differ from the colorless and transparent $TiO_2$ in that they reflect and absorb light. Accordingly, the low order oxides of titanium have their own substance colors which vary from blue, brown to black. The substance colors are compounded with the interference colors resulting from the $TiO_2$ to produce a variety of colors. These light absorbing portions can be formed by reducing the $TiO_2$ layer locally, or they can be deposited on the surface of the $TiO_2$ layer in a scattering manner. In particular, as later described, it is especially convenient to form the light absorbing portions simultaneously with the formation of the glossy portions.

The glossy portions have a metallic glossy effect, and it can be formed with titanium, zirconium, tungsten, nickel, aluminum, silver, platinum, gold or the like by a chemical method, such as electroplating, electroless plating or the like, and a physical method, such as sputtering, vapor deposition, ion plating or the like. For instance, as later described, when titanium is deposited on the $TiO_2$ layer by sputtering, part of the $TiO_2$ layer is reduced simultaneously with the titanium deposition. Thus, the light absorbing portions which include low order oxides of titanium can be formed simultaneously with the formation of the glossy portions.

It is preferred to form the light absorbing portions and glossy portions so as to occupy from 0.03 to 98% of an entire surface area of the $TiO_2$ layer in a total projection area on the $TiO_2$ layer. When they occupy less than 0.03%, the covering power of the pigment decreases. When they occupy more than 98%, the pigment produces the interference colors in a lesser strength. The light absorbing portions and the glossy portions can be formed on the $TiO_2$ layer independently of each other, or the glossy portions can be formed so as to overlap the light absorbing portions. As later described, a surface treatment can be carried out onto the present pigment in order to give it a weather resistance. The surface treatment can be a chromium, alumina or zirconia treatment.

As illustrated in FIG. 2, in the present pigment, a reflection light "A," for instance, which is reflected by the surface of the $TiO_2$ layer 101, and a reflection light "B," which is reflected by the boundary between the $TiO_2$ layer 101 and the substrate 101, interfere each other. Accordingly, the present pigment produces an interference color which depends on the product of the $TiO_2$ layer thickness and the $TiO_2$ layer refractive index (i.e., "$TiO_2$ layer thickness"×"$TiO_2$ layer refractive index"). Further, part of the incident light is absorbed by the light absorbing portions 102, and thereby a reflection light "C" produces the substance colors of the light absorbing portions 102. Furthermore, a reflection light "D," which is reflected by the glossy portions 103, produces a metallic glossy effect. Therefore, the present pigment can produce deep and unique colored metallic hues in which these reflection lights, interference lights, absorption lights and metallic glossy effects are compounded.

Generally speaking, the more the light passes through a pigment, the smaller the covering power of the pigment becomes. In the present pigment, part of a light "F," which passes through the substrate 100, is absorbed by the light absorbing portions 102 which are disposed on the opposite side. Hence, the amount of the light which passes through the present pigment is less than the amount of the light which passes through the conventional pearl mica pigment, and consequently the covering power of the present pigment improves. In addition, when the light is viewed in a shade direction, the present pigment produces vivid colors because the light absorbing portions 102 absorb the light to cause the irregular reflections less. As a result, the contrast is remarkable between the light viewed in the front direction and the light viewed in a shade direction, and accordingly the present pigment exhibits a favorable "flip-flop" characteristic.

Moreover, a light "E," which passes through a pigment and which is reflected by a base or a surface of the other pigment to re-enter the original pigment, are recombined with the reflection light "A" and the reflection light "B" to weaken the interference colors. However, in the present pigment, part of the light, which passes through the substrate 100, is absorbed by the light absorbing portions 102 which are disposed on the opposite side, and part of the light, which is reflected by a base or a surface of the other present pigment to reenter the original present pigment, is also absorbed by the light absorbing portions 102. Consequently, the amount of the reflection light "E" is reduced when compared with that of the conventional pearl mica pigment. Thus, the present pigment inhibits the interference colors from weakening, and it produces strong interference colors.

According to the present pigment, it is possible to obtain the metallic glossy effect, the strong interference colors and the color production resulting from the substance colors of the light absorbing portions. In addition, the present pigment exhibits a great covering power. Therefore, the present pigment is extremely useful for an automobile top coat paint.

Further, the present inventors have continued the research and development in order to solve the problems associating with the conventional pearl mica pigment and the problems associating with the production process therefor, and they have found a phenomenon that the $TiO_2$ layer is reduced to the low order oxides of titanium when the surface of the conventional pearl mica pigment is coated with metallic titanium by sputtering under a vacuum condition.

In accordance with this method, it is unnecessary to heat and reduce the conventional pearl mica pigment in a hydrogen gas at the high temperature of from 500° to 1,000° C. In addition, it is possible not only to color the conventional pearl mica pigment in a variety of colors such as gold, silver, red, blue, green or the like, but also to incorporate the interference colors into the conventional pearl mica pigment. Thus, the present inventors found that it is possible to produce a novel pigment having new decorativeness, which has not be available so far, with this method.

As for the method for coating the surface of the conventional pearl mica pigment, vacuum deposition, ion plating, CVD (chemical vapor deposition) can be used in addition to the above-mentioned sputtering. However, since the target of the coating is a powder, these methods somewhat suffer from problems which associate with the constructions of the apparatuses, the control of the metallic titanium coating amount or the like.

There is provided a process for producing a pigment according to a second aspect of the present invention which comprises the steps of:

supplying a pigment which comprises a transparent or semi-transparent scaly substrate coated with a $TiO_2$ layer under a decompression and heating condition; and coating said pigment with metallic titanium in a scattering manner by sputtering, thereby reducing part of the $TiO_2$ layer to low order oxides of titanium.

It is preferred to carry out the sputtering at a temperature of 200° C. or less in the coating step. When it is carried out at a temperature of more than 200° C., the pigment tends to aggregate intensely and to become massive. As a result, it is impossible to coat the pigment with the metallic titanium uniformly.

In addition, it is preferred to carry out the present production process by circulating the pigment through a powder decompression and heating treatment station, a fluidized bed sputtering station and a fluid mill powder dispersing treatment station, thereby carrying out the metallic titanium coating by sputtering repeatedly.

A novel pigment obtained by the present production process has a construction similar to that of the pigment according to the first aspect of the present invention, and it operates similarly thereto. Additionally, the novel pigment is characterized by a varying component ratio of titanium with respect to oxygen in the thickness-wise direction of the $TiO_2$ layer.

As for the pigment which comprises a transparent or semi-transparent scaly substrate coated with the $TiO_2$ layer, a conventional pearl mica can be used, for instance. The conventional pearl mica pigment includes the transparent or semi-transparent scaly substrate which has a length of from 1 to 75 micrometers, preferably from 5 to 40 micrometers, and a thickness of from 0.03 to 0.3 micrometers, preferably from 0.10 to 1.0 micrometers, and which is coated with the $TiO_2$ layer entirely.

In the pigment, the $TiO_2$ can be contained in an amount of from 10 to 60% by weight with respect to the substrate. Depending on a thickness of the $TiO_2$ layer, the interference colors such as silver, blue, green, red, reddish purple, gold or the like can be given to the pigment.

The novel pigment produced by the present production process has the hues which are in the same family of the hues of a raw material, i.e., the conventional pearl mica pigment. The less the metallic titanium is sputtered, the brighter the novel pigment becomes. On the other hand, the more the metallic titanium is sputtered, the darker the novel pigment becomes. As for the sputtering amount of the metallic titanium, it is preferred to sputter the metallic titanium in an amount of from 1 to 30% by weight with respect to the raw material. When the sputtering amount is less than 1% by weight, the coloring effect is hardly appreciated. When the sputtering amount is more than 30% by weight, the novel pigment produces a metallic gray which is not a chromatic color. Hence, it is not preferred to coat the raw material in the sputtering amount.

The novel pigment produced by the present production process can be used as a new colored pigment which is adapted for paints and plastics for the applications such as exterior construction materials, interior construction materials, home electric products, automobiles, ships or the like.

Furthermore, as a result of the research and development which have been made by the present inventors in order to improve the strengths of the interference colors and the covering power of the pigment which is disclosed in Japanese Patent Publication (KOKAI) No. 108,267/1989. The present inventors have completed a third aspect of the present invention. Namely, there is provided a metallic paint according to the third aspect of the present invention which comprises a pigment, the pigment including:

a transparent or semi-transparent scaly substrate;

a $TiO_2$ layer coated on an entire surface of the substrate;

light absorbing portions formed on a surface of the $TiO_2$ layer in a scattering manner and including low order oxides of titanium; and glossy portions formed on a surface of the $TiO_2$ layer in a scattering manner and having a metallic glossy effect.

In addition to the above-described novel pigment, the present metallic paint can further include the other components such as a resin which constitutes a matrix, a pigment, an additive or the like. As for the resin, it is possible to use a variety of resins, which are employed in the conventional metallic paint, such as an acrylic resin, a melamine resin, a polyester resin or the like. As for the pigment, it is possible to constitute it with the novel pigment only, or it is also possible to mix the novel pigment with the conventional pearl mica pigment or a variety of organic pigments and inorganic pigments. In addition, it is possible to use a variety of additives such as a dispersing agent, a plasticizer, a surface active agent or the like which have been employed conventionally.

Here, it is preferred to include the above-described novel pigment in an amount of from 1 to 20 parts by weight with respect to 100 parts by weight of the solid components in the present metallic paint. When the amount is less than 1 parts by weight, the advantageous effect of the novel pigment inclusion is appreciated insufficiently. When the amount is more than 20 parts by weight, the dispersion stability of the paint decreases, thereby decreasing the vividness of the images on the paint film and deteriorating the operability in painting.

Moreover, the present inventors have further continued the research and development, and they have found that it is possible to give an extremely good weather resistance to the conventional pearl mica pigment as follows. The surface of the conventional pearl mica pigment is first coated with chromium (III) hydroxide, and thereafter low order oxides of titanium and metallic titanium are formed by sputtering on the surface the thus coated pearl mica pigment in a scattering manner, and then the resulting pearl mica pigment is further coated with chromium (III) hydroxide. As a result, a fourth aspect of the present invention has been completed. Namely, there is provided a process for producing a novel and weather resistant pigment according to a fourth aspect of the present invention which comprises the steps of:

a first coating step of coating a surface of a transparent or semi-transparent scaly substrate with chromium (III) hydroxide, the substrate coated with a semi-transparent layer which includes rutile type $TiO_2$ mainly;

a step of forming low order oxides of titanium and metallic titanium on a resulting substrate in a scattering manner; and a second coating step of coating a surface of a resulting substrate with chromium (III) hydroxide.

The transparent or semi-transparent scaly substrate can be identical with that of the novel pigment according to the first aspect of the present invention. The rutile type $TiO_2$ layer can be coated on the substrate in a manner as set forth in U.S. Pat. No. 4,038,099.

In the present production process, the first coating step is carried out with chromium (III) hydroxide. This step can be carried out as follows. A dilute solution including a soluble chromium (III) compound such as chromium chloride and chromium sulfate is hydrolyzed, thereby coating the substrate particles with a thin film of the resulting chromium (III) hydroxide. The dilute solution of the soluble chromium (III) compound contains chromium in an amount of from 0.5 to 5% by weight, preferably from 1 to 2.5% by weight.

In the first coating step, the substrate is first added to water at room temperature to make a slurry in a concentration of from 5 to 15% by weight, and a pH of the resulting slurry is kept in a range of from 5.5 to 6.5 with a diluted sulfuric acid or the like. Then, a chromium (III) compound solution is added to the slurry while stirring the slurry. The addition of the chromium (III) compound solution takes from 0.1 to 2.0 hours, preferably from 0.25 to 0.75 hours, and the addition speed is constant preferably. It is also preferred to keep a pH of the slurry at 6.0 approximately with a dilute potassium hydroxide or the like.

Also in the first coating step, the chromium (III) compound is added to the slurry in a sufficient amount of from 0.2 to 1.0% by weight as chromium with respect to a total amount of the substrate coated with the rutile type $TiO_2$ layer, preferably from 0.3 to 0.6% by weight. After adding all the chromium (III) compound solution, the slurry is filtered. The resulting cake is washed, and it is dried at a temperature of from 90° to 120° C. for 1 to 2 hours.

Then, in accordance with the production process according to the second aspect of the present invention, metallic titanium is deposited on the $TiO_2$ layer. The $TiO_2$ layer is reduced simultaneously with the deposition of the metallic titanium, and thereby the low order oxides of titanium can be formed in a scattering manner.

As aforementioned in the second aspect of the present, it is preferred to sputter the metallic titanium (Ti) in an amount of from 1 to 30% by weight with respect to the substrate. It is further preferred to sputter the metallic titanium in an amount of from 2 to 20% by weight with respect to the substrate. When the sputtering amount is less than 2% by weight, the coloring power, the covering power and the metallic glossy effect of the novel pigment decrease sharply. Hence, such a novel pigment cannot be not used in practical applications. When the sputtering amount is more than 20% by weight, the novel pigment produces an improved covering power and an improved metallic glossy effect, but it suffers from a decreased coloring power and increased production costs.

As later described in the "Sixth Preferred Embodiment" section, when the metallic titanium is sputtered in an amount of 2% by weight, the low order oxides of titanium are produced in an amount of 2.2% by weight, and the metallic titanium is produced in an amount of 0.5% by weight. In this case, the low order oxides of titanium which form the light absorbing portions and the metallic titanium which forms the metallic glossy portions occupy approximately 0.05% of an entire surface area of the $TiO_2$ layer in a total projection area. On the other hand, when the metallic titanium is sputtered in an amount of 20% by weight, the low order oxides of titanium are produced in an amount of 6.7% by weight, and the metallic titanium is produced in an amount of 14.7% by weight. In this case, the light absorbing portions and the metallic glossy portions occupy approximately 95% of an entire surface area of the $TiO_2$ layer in a total projection area. Thus, when the metallic titanium is sputtered in an amount of from 2 to 20% by weight, the novel pigment can be made into one which has all the characteristics such as the coloring power, the covering power and the metallic glossy effect which can be applicable to a practical usages.

In other words, it is preferred to form the light absorbing portions and the metallic glossy portions so as to occupy from 0.03 to 98% of an entire surface area of the $TiO_2$ layer in a total projection area. When they occupy less than 0.03%, the novel pigment exhibits a decreased covering power. When they occupy more than 98%, the novel pigment produces the interference colors in a lesser strength.

The first coating step and the second coating step can be carried out as follows. The substrates which have been undergone the predetermined treatments are suspended in an aqueous solution, and they are coated with chromium (III) hydroxide and/or chromium (III) phosphate. The coating condition of these coating steps can be varied in a wide range. However, it is only a preferred condition that insoluble chromium (III) compounds are generated in the suspension by hydrolysis or reduction at a speed so as to deposit on the surface of the substrates continuously and without forming free nuclei in a significant amount.

The insoluble chromium (III) compounds can be generated by starting with the soluble chromium (III) compound. When the soluble chromium (III) compound is adapted for a raw material, hydroxyl ions or phosphate ions are included in the suspension of the substrates in a necessary amount so as to precipitate the chromium (III) hydroxide or chromium (III) phosphate, and the chromium (III) compound solution is added to the suspension slowly to generate the chromium (III) hydroxide or chromium (III) phosphate layer. Further, the chromium (III) compound is included in the suspension of the substrates, and the hydroxyl ions or phosphate ions are added to the suspension slowly to generate the chromium (III) hydroxide or chromium (III) phosphate layer. Furthermore, the chromium (III) compound solution and a solution containing the ions to be precipitated can be added to the suspension of the substrates at the same time. If such is the case, a pH of the suspension is kept at a constant value while adding the solutions. Moreover, the chromium (III) hydroxide or chromium (III) phosphate layer can be generated in situ by a chemical reaction such as a homogeneous hydrolysis in the substrates suspension which contains the soluble chromium (III) compound.

Likewise, the insoluble chromium (III) compounds can be formed of chromium (III) ions or chromium (IV) compounds in situ. For instance, the insoluble chromium (III) compounds can be generated in situ by admixing a chromium (IV) compound solution and a reducing agent such as hydrazine, hydroxylamine or the like to the suspension of the substrates one component by one component, or by slowly admixing both of them thereto at the same time.

In the first and second coating steps, it is necessary to keep a pH of the suspension of the substrates at approximately 3.0 or more, more preferably in a range of from 4.5 to 9.0. When adjusting a pH of the suspension of the substrates, which has been strongly acidified, by independently adding an acidic chromium (III) compound solution, any base can be used in principle. For instance, it is preferred to use ammonium (either in a solution form or a gas form), a sodium hydroxide solution, a potassium hydroxide solution or the like.

In order to supply the chromium (III) ions, either chromium (III) compound or chromium (IV) compound can be used in general. In particular, it is preferred to use $CrCl_3$, a chromium aluminate solution, potassium dichromate or the like. When precipitating the chromium (III) phosphate, not only orthophosphoric acid, but also primary, secondary and tertiary orthophosphoric acids and polymerized phosphates can be used. As for an appropriate example, the following are available in addition to phosphoric acid: i.e., $KH_2PO_4$, $NaH_2PO_4 \cdot 12H_2O$, $Na_3PO_4 \cdot 12H_2O$, $Na_4P_2O_7 \cdot 7H_2O$ and $(NaPO_3)_x$.

The coating of the chromium (III) hydroxide or chromium (III) phosphate layer can be carried out at any temperature of from a freezing point to a boiling point of the suspension of the substrates. The present inventors have found that the second coating can be formed at a relatively lower temperature.

It is not always necessary to form pure chromium (III) hydroxide or chromium (III) phosphate layer on the substrate. Not only a mixture of the chromium (III) hydroxide and chromium (III) phosphate, but also another mixture, preferably the mixture which contains colorless metal oxides, can be used. If such is the case, the colorless metal oxides are deposited in a form of a film layer together with the insoluble chromium (III) compounds, or they are deposited before or after the insoluble chromium (III) compounds are deposited.

The thus precipitated chromium (III) hydroxide or chromium (III) phosphate layer can be converted to its chemical composition by a subsequent reaction. For instance, the precipitated chromium (III) hydroxide layer can be converted to the chromium (III) phosphate layer partially or entirely by treating the substrate particles coated with the chromium (III) hydroxide layer with a solution which contains phosphate, and this can be done without impairing the advantageous effect of the precipitated chromium (III) hydroxide layer.

In order to achieve the weather resistance improvement in accordance with the present production process, it is sufficient to coat the substrate with the insoluble chromium (III) compounds in a relatively small amount. For instance, a satisfactory stabilizing effect can be already appreciated in a coating amount of 0.5% by weight (a value calculated as a $CrCl_3$ weight with respect to a total weight of the substrate). The present inventors have found that, after it is calcined, the novel pigment produces a more beautiful gold color hue as the insoluble chromium (III) compounds coating amount increases. This phenomenon results from the generation of chromium titanate. However, when the substrate is coated with the insoluble chromium (III) compounds in an amount of approximately 4% by weight or more, the whole chromium cannot be converted into the chromium titanate, part of the chromium is left as chromium oxides, and eventually the chromium oxides themselves appear in green as a powder color of the substrate. This coloring is not preferable in general, though it can be used for a special usage. Therefore, it is preferred to coat the substrate with the insoluble chromium (III) compounds in an amount of from 0.2 to 3% by weight approximately which is calculated as a $Cr_2O_3$ weight with respect to a total weight of the substrate.

The weather resistance of the novel pigment cannot be improved satisfactorily by only carrying out the second coating step after the sputtering treatment. This is believed as follows. The conventional techniques are intended for a simple one-component layer which includes the $TiO_2$ of the rutile type or the like, and they are not intended for a complex three-component layer which includes the $TiO_2$, low order oxides of titanium and metallic titanium. Hence, it is hard to coat a uniform chromium (III) hydroxide layer on an entire surface of this three-component layer by carrying out the coating treatment once, and accordingly there remain parts on which the treatment is applied insufficiently. Thus, the weather resistance cannot be improved.

In addition, when only the first coating step before the sputtering treatment is carried out, parts of the chromium (III) hydroxide layer are destroyed by the titanium plasma in a high energy state during the sputtering. As a result, it is also believed that no sufficient weather resistance can be given to the novel pigment.

On the other hand, when the first and second coating steps are carried out, the parts of the chromium (III) hydroxide layer, which have been destroyed by the titanium plasma in a high energy state during the sputtering, are coated with the chromium (III) hydroxide again, and most of the base (i.e., the TiO$_2$ layer) has been already coated with the chromium (III) hydroxide layer. Consequently, it is believed that the chromium (III) hydroxide layer are coated efficiently on the low order oxides of titanium and the metallic titanium which are formed in a scattering manner.

The novel pigment produced in accordance with the present process has a remarkably improved weather resistance when compared with the pigments produced by the conventional techniques. This novel pigment can be used in the same usages as the current usages, for instance, it can be used as an additive for plastics, inks, paints or the like, and it can be used in cosmetics as well. The improved weather resistance enables the present novel pigment to be used in any application in which it is subjected to a variety of environmental conditions, for example, it is optimum for automobile paints.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 7 is a scanning electron microscope (hereinafter simply referred to as "SEM") photograph for illustrating a particulate structure of the pigment of the First Preferred Embodiment;

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

FIRST PREFERRED EMBODIMENT

Figure 1:
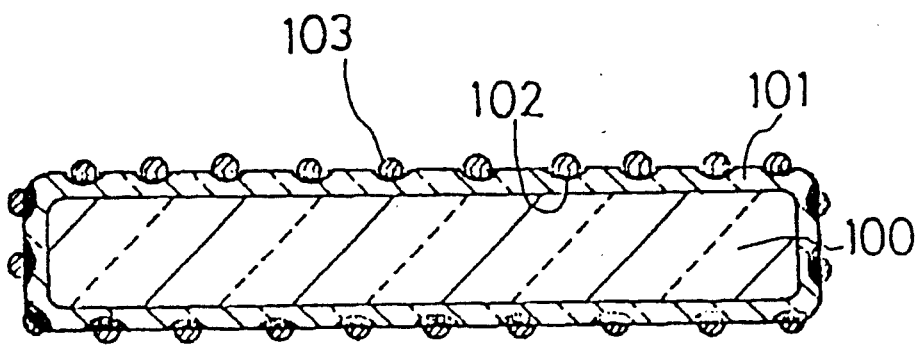
FIG. 1 is a schematic cross sectional view of a pigment of a First Preferred Embodiment according to the present invention.
Figure 2:
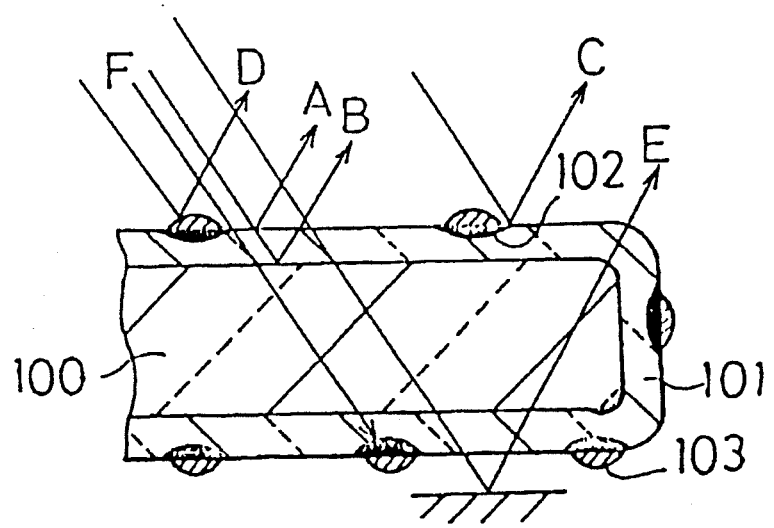
FIG. 2 is an enlarge schematic cross sectional view of the pigment of the First Preferred Embodiment for explaining optical operations thereof.

FIGS. 1 and 2 are schematic cross sectional views of the pigment of the First Preferred Embodiment according to the present invention. This pigment comprises a mica 100 as the scaly substrate, a TiO$_2$ layer 101 coated on an entire surface of the mica 100, light absorbing portions 102 formed on a surface of the TiO$_2$ layer 101 in a scattering manner and including low order oxides of titanium, and glossy portions 103 formed on a surface of the light absorbing portions 102 in a scattering manner and including metallic titanium. A production process for this pigment will be hereinafter described.

Production of Pearl Mica Pigment 50 grams of a mica flake which had a particle diameter of from 10 to 20 micrometers and a thickness of 0.5 micrometers approximately were added to 500 milliliters of ion-exchanged water, and it was stirred to disperse uniformly. 158.2 milliliters of an aqueous titanyl sulfate which had a concentration of 40% by weight was added to the resulting dispersion. Then, the dispersion was boiled for 6 hours while stirring. After cooling the dispersion, the resulting precipitates were filtered and washed, and they were calcined at a temperature of 900° C. Thus, a red pearl mica pigment whose surface was covered with TiO$_2$ was obtained in an amount of 90 grams.

Description on Power Sputtering Apparatus

Figure 3:
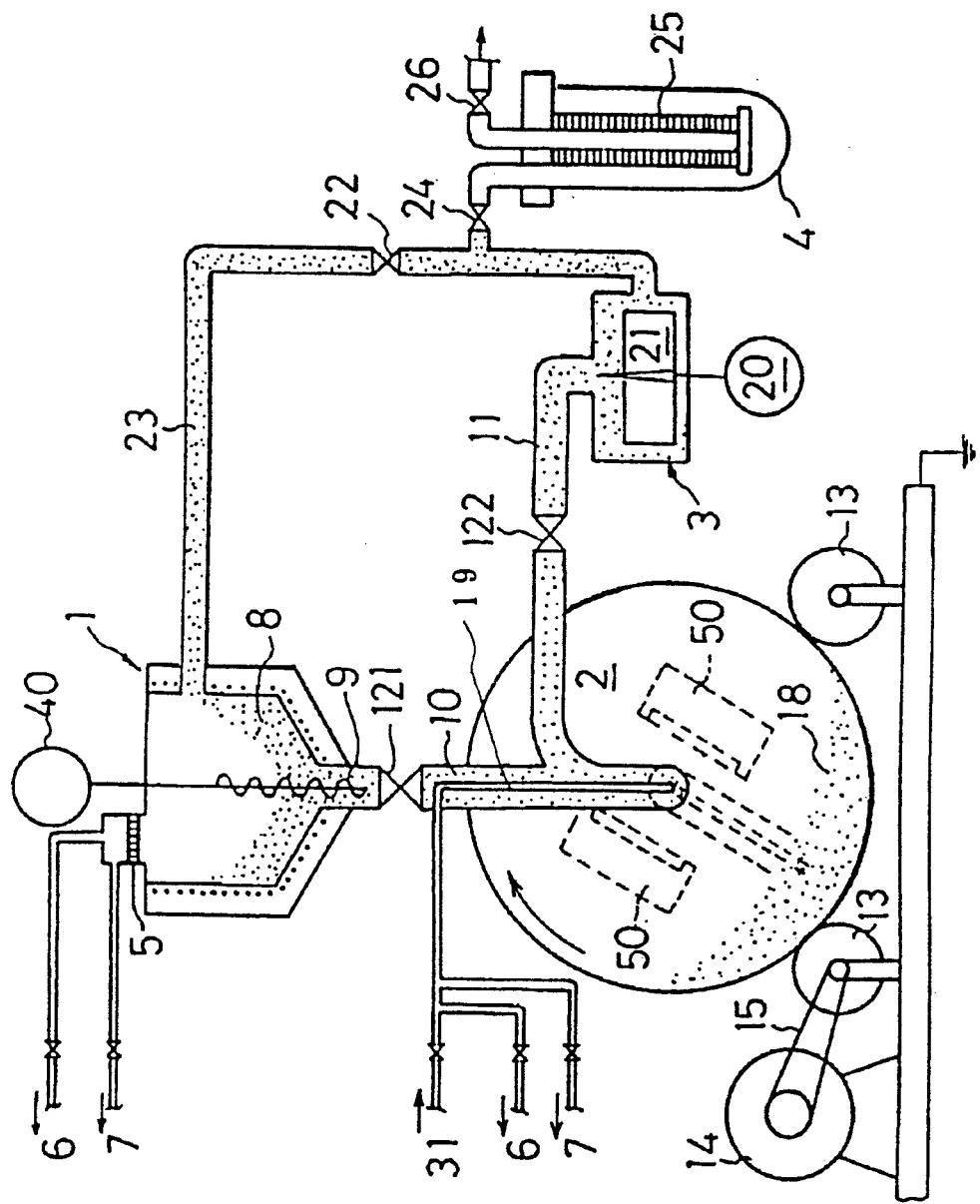
FIG. 3 is a front view of a powder sputtering apparatus which is employed for producing the pigment of the First Preferred Embodiment.
Figure 4:
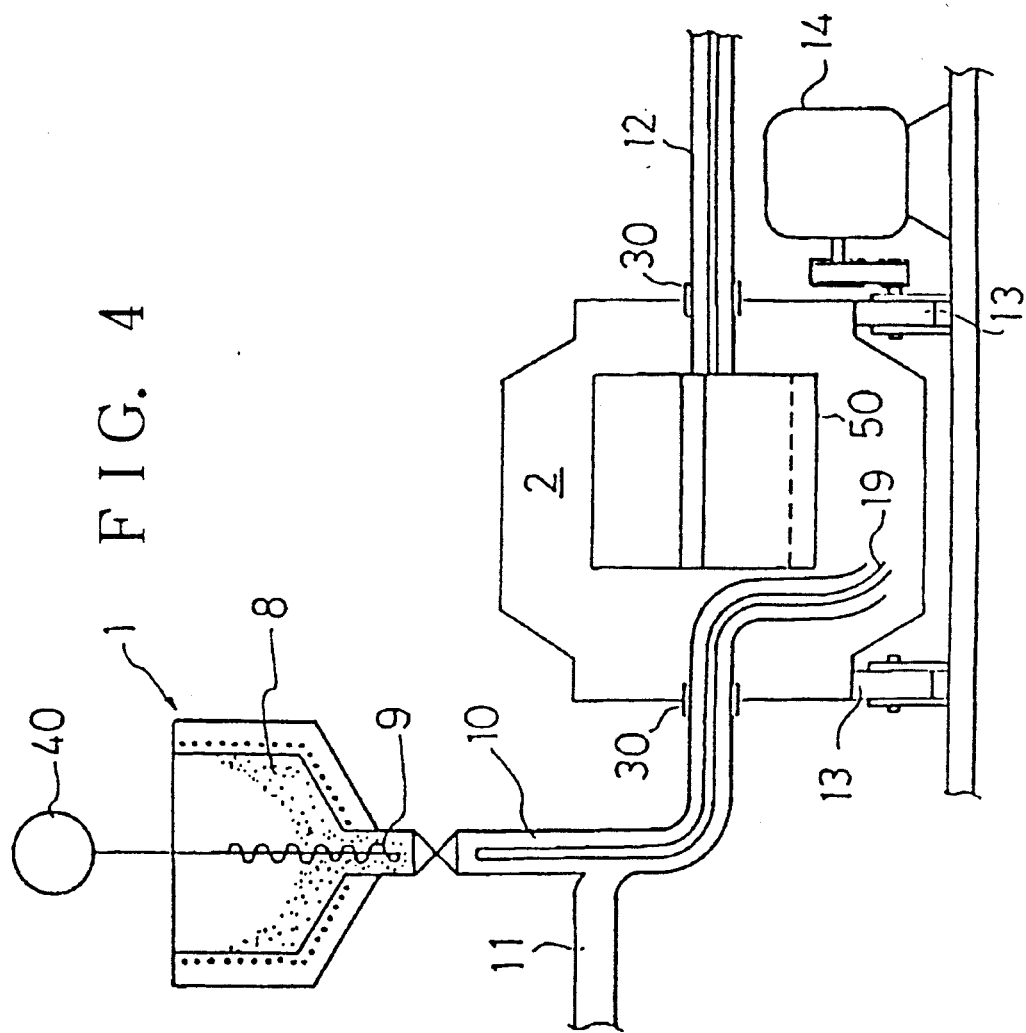
FIG. 4 is a side view of the powder sputtering apparatus.

Then, a metallic titanium sputtering was carried out onto the thus obtained pearl mica pigment by using the powder sputtering apparatus illustrated in FIGS. 3 and 4. This powder sputtering apparatus comprised a decompression and heating treatment chamber 1, a rotary barrel type sputtering chamber 2, a fluid jet mill 3, and a powder filter 4.

The decompression and heating treatment chamber 1 was a container which was heated with an electric resistance, and it communicated with a main exhaust system 6 and a higher degree exhaust system 7 by way of a filter 5. The main exhaust system 6 was a mechanical vacuum pump, and the higher degree exhaust system 7 was a combination of a cryosorption pump, a turbo molecular pump, a mechanical booster pump or the like and a refrigerating trap. The decompression and heating treatment chamber 1 included a screw feeder 9 and a motor 40 for rotating the screw feeder 9, and it was adapted so that decompressed and heated fine powders 8 were dropped into a conduit 10 which was provided for delivering the fine powders 8 into the rotary barrel type sputtering chamber 2.

The rotary barrel type sputtering chamber 2 (hereinafter simply referred to as "barrel" 2) was a rotatable cylindrical body which had a construction like a ball mill, as illustrated in FIG. 4. One of its side walls supported a shaft which also worked as the conduit 10 by way of a magnetic seal 30 rotatably, and the other one of its side walls supported a shaft 12 which worked as a rotary shaft by way of a magnetic seal 30 rotatably. At a front end of the shaft 12, a pair of sputtering apparatuses 50 were held opposedly, as illustrated in FIG. 3. The attitude of the sputtering apparatuses 50 was not vertical, but they had an inclination which depended on positions of a fluidized fine powder bed 18 resulting from the rotation of the barrel 2. These sputtering apparatuses 50 were operated by a high frequency electric current which were supplied through the shaft 12.

The sputtering apparatuses 50, for example, a bipolar magnetron, were held on an extension line of the shaft 12, and they were constructed so that their distances from the fluidized fine powder bed 18 were adjustable with a height adjustment screw (not shown). Of course, this height adjustment was carried out with the side walls of the barrel 2 removed when a sputtering operation was not under way.

As illustrated in FIG. 3, the conduit 10 communicated with the decompression and heating treatment chamber 1 by way of a valve 121. Turning now to FIG. 4, the conduit 10 entered into the barrel 2 horizontally through the one of the side walls of the barrel 2, and it curved downward again to reach near a bottom of the barrel 2. The conduit 10 did not curve downward vertically, but it curved so as to face the positions of the fluidized fine powder bed 18 which resulted from the rotation of the barrel 2. Further, as illustrated in FIG. 3, the conduit 10 included a pipe 19 therein which communicated with the main evacuation system 6 and the higher degree evacuation system 7 and an inert gas supply source 31. Furthermore, the conduit 10 communicated with an exhaust conduit 11 by way of a valve 122. The exhaust conduit 11 was adapted for delivering the fine powders to the fluid jet mill 3.

Moreover, pipes which were made of graphite and which were less likely to be coated by sputtering were used for the conduit 10, which were disposed in the barrel 2, and the exhaust conduit 11 as well as for the smaller diameter pipe 19, which communicated with the main evacuation system 6 and the like.

The barrel 2 was supported by a pair of supporting rollers 13. One of the supporting rollers 13 was connected to a rotary shaft of a motor 14 by way of a belt 15. Thus, the barrel 2 was rotated by the rotation of the motor 14.

The fluid jet mill 3 included a propeller 21 which was rotated by a motor 20 so that the fine powders delivered through the exhaust conduit 11 collided with the propeller 21. An exhaust side of the fluid jet mill 3 communicated with a circulation pipe 23 which included a valve 22, and the circulation pipe 23 further communicated with the decompression and heating treatment chamber 1. Furthermore, a lower side of the valve 22 of the circulation pipe 23 communicated with the powder filter 4 which included a valve 24. The powder filter 4 was a trap which communicated with an exhaust system 26 by way of a cylindrical filter 25.

Formation of Light Absorbing Portions and Metallic Glossy Portions 90 grams of the above-described pearl mica pigment was supplied into the barrel 2 of the above-described powder sputtering apparatus, and the decompression and heating treatment chamber 1 was decompressed to $2 \times 10^{-5}$ Torr. Then, an argon gas was supplied gradually through a pipe 31 in order to supply the pigment into the fluid jet mill 3. After colliding the pigment with the propeller 2 so as to disperse it in its primary particles, the pigment was collected in the decompression and heating treatment chamber 1. Then, the decompression and heating treatment chamber 1 was decompressed to $2 \times 10^{-2}$ Torr, and it was heated to 100° C. with a heater. Thus, the collected pigment was dried, and degassing was carried out for 30 minutes.

Thereafter, the pigment was transferred into the barrel 2 whose atmosphere had been substituted with an argon gas in advance. Then, sputtering was started with a bipolar type magnetron under a decompression of $2 \times 10^{-2}$ Torr while rotating the barrel 2 at a speed of 5 rpm. The sputtering conditions were as follows: A target was titanium. Two power sources each having a capacity 0.2 kW were used. A frequency was 13.56 MHz. A temperature of the pigment was 200° C. or less. When the sputtering was carried out under these conditions for 1 hour, the pigment was coated with titanium in an amount of approximately 0.05% of the entire surface area of the pearl mica pigment (or 2.0% by weight with respect to the weight of the pearl mica pigment). This process was repeated 10 times to coat the pigment with titanium in an amount of 95% (or 20% by weight) in total.

After coating the pigment, an argon gas was supplied into the barrel 2 through the pipe 31 so as to collect the thus obtained pigment in the powder filter 4.

Evaluation

Figure 5:
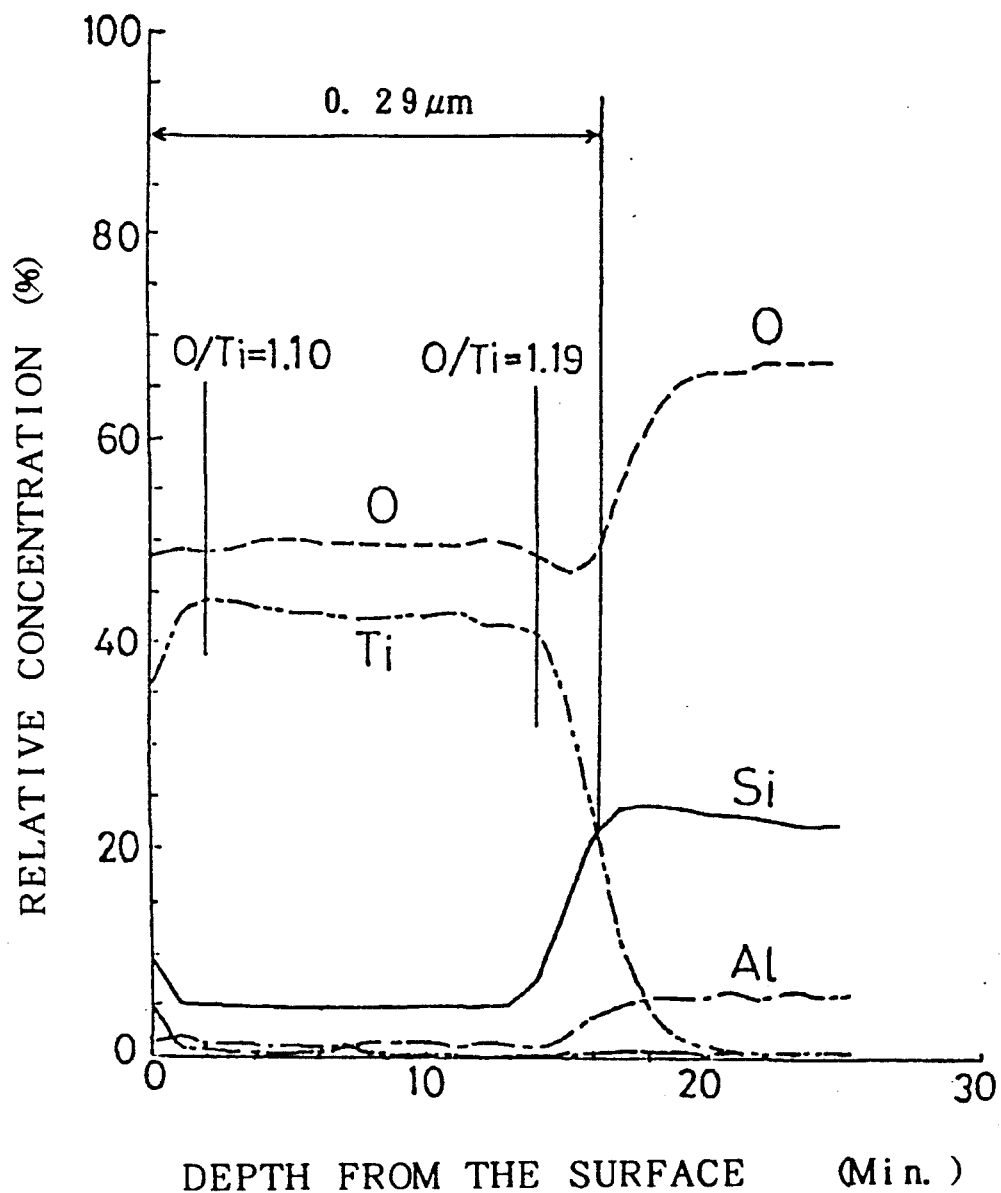
FIG. 5 is an Auger electron spectroscopy (hereinafter simply referred to as "AES") chart of the pigment of the First Preferred Embodiment.
Figure 6:
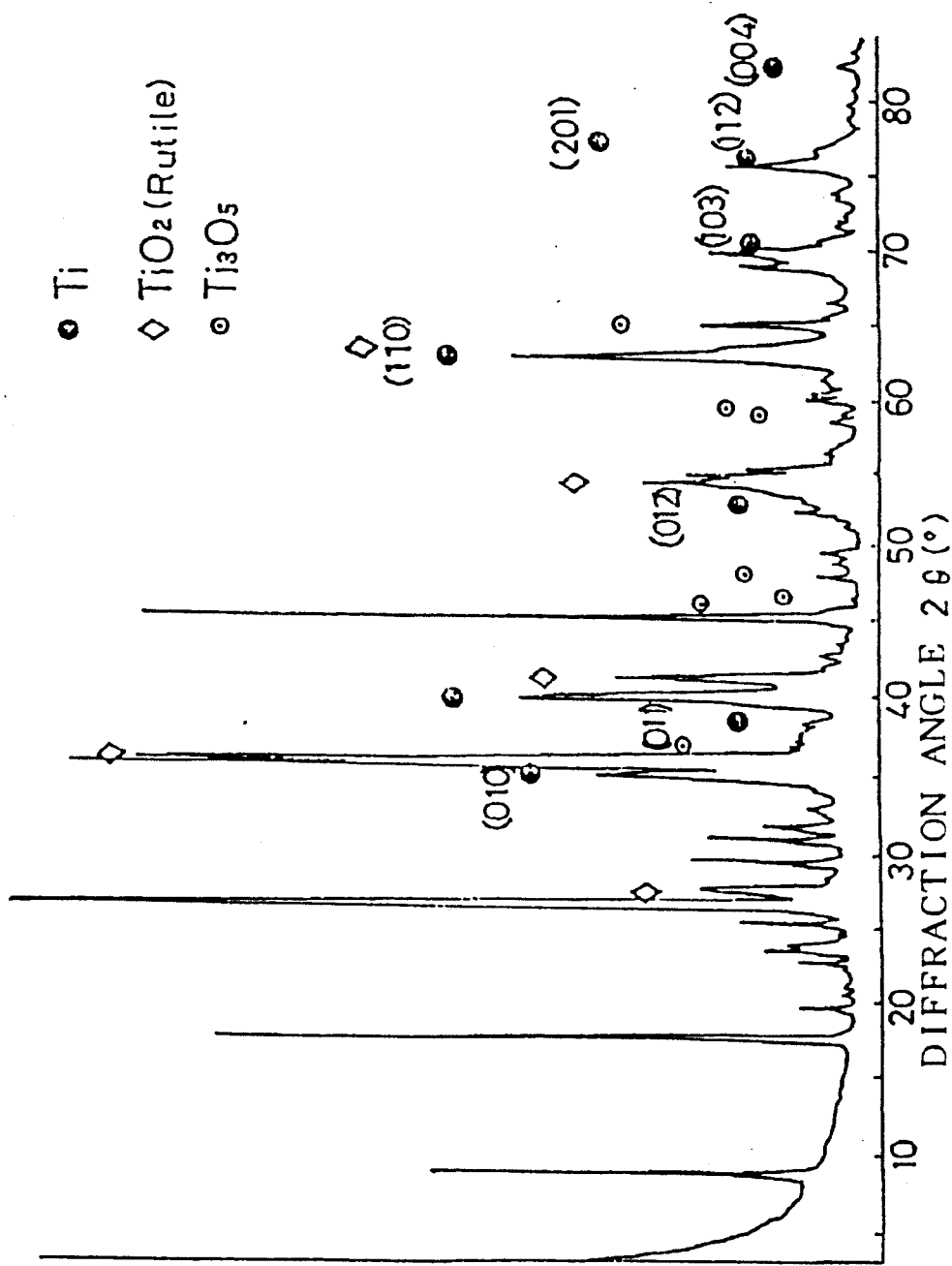
FIG. 6 is an X-ray diffraction chart of the pigment of the First Preferred Embodiment.

The thus obtained pigment was subjected to the AES analysis for its surface and to the X-ray diffraction analysis. The results of these analyses are illustrated in FIGS. 5 and 6. According to FIGS. 5 and 6, the pigment had the low order oxides of titanium on its surface, and of course it had the titanium layer formed thereon. Namely, it is apparent that the $TiO_2$ was reduced to form the low order oxides of titanium when the sputtered atoms including titanium collided with the $TiO_2$ layer.

In addition, when the thus obtained pigment was observed with an SEM, it was observed that the titanium particles were formed like islands in a scattering manner on its surface, as illustrated in FIG. 7.

SECOND PREFERRED EMBODIMENT

The pigment of the Second Preferred Embodiment was produced in an identical manner with that of the First Preferred Embodiment. However, the production process of this pigment differed in that the aqueous titanyl sulfate was used in an amount of 3125.5 milliliters to prepare a pearl mica pigment which produced the interference color in green in an amount of 100 grams in the production step of pearl mica pigment, and in that two power sources each having a capacity 3.0 kW were used in order to carry out sputtering so that the pearl mica pigment is coated with metallic titanium in an amount of approximately 3.0% by weight with respect to the weight of the pearl mica pigment for 1 hour. This process was repeated 10 times to coat the pearl mica pigment with metallic titanium in an amount of 30% by weight in total, thereby obtaining the pigment of the Second Preferred Embodiment in green.

Figure 8:
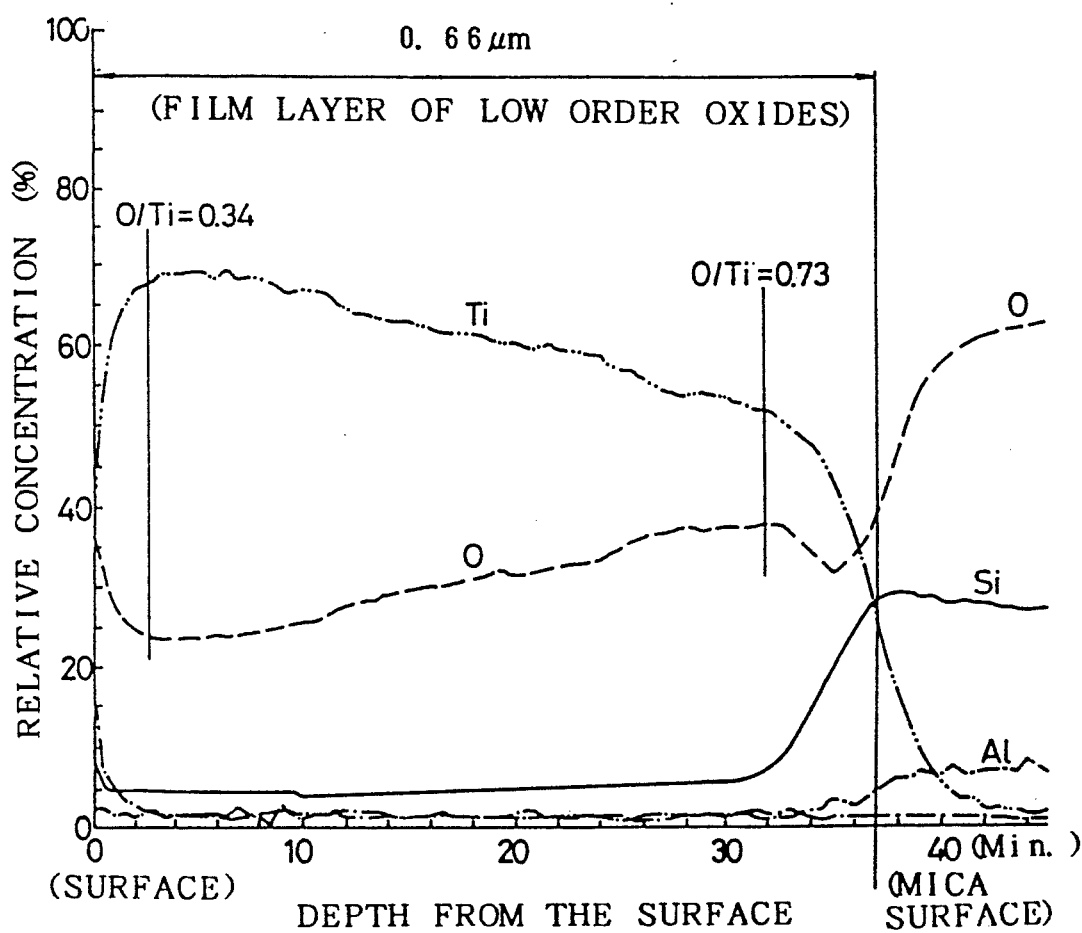
FIG. 8 is an AES chart of a pigment of a Second Preferred Embodiment according to the present invention.

According to the AES analysis for the thus obtained green pigment, it was found that the surface of the mica was coated with a film layer of low order oxides of titanium in a thickness of 0.66 micrometers approximately. The component ratio of titanium with respect to oxygen varied in the thickness-wise direction of the $TiO_2$ layer of the pigment, as illustrated in the AES chart of FIG. 8.

THIRD PREFERRED EMBODIMENT

Preparation of Paint

The pigment obtained in the First Preferred Embodiment was mixed with an acryl melamine clear paint so that a "PWC" (i.e., pigment weight content) was 10%. The acryl melamine clear paint included an acrylic resin in an amount of 35% by weight, a butylated melamine resin in an amount of 15% by weight, an organic solvent in an amount of 5% by weight, and additives in trace amounts. The resulting mixture was stirred to uniformize it sufficiently. A metallic paint of the Third Preferred Embodiment was thus prepared.

Evaluation on Paint

This metallic paint was coated on a black and white covering power test paper with a 25-mil bar coater, and then it was baked and dried at 140° C. for 30 minutes to form a paint film. The paint film was measured for each of the hues on the black base surface and the white base surface, and it was also evaluated visually for the overall coverability, the color turbidity (or the transparency), the metallic glossy effect and the ability to vary the hue depending on viewing angles (i.e., the "flip-flop" characteristic). The results of these tests are summarized in Table 1. It is apparent from Table 1 that this paint film produced strong interference colors, that it had a good metallic glossy effect, and that it was superior in the coverability.

It is apparent from the following facts that this pigment had a construction as schematically shown in FIG. 1. Namely, it was necessary that the $TiO_2$ layer be exposed partially at least in order to produce the interference colors. The low order oxides of titanium were formed when the titanium collided with the $TiO_2$ layer. The pigment had a metallic glossy effect resulting from titanium. The surface of the pigment was observed with an SEM to have the titanium particles formed in a scattering manner.

FOURTH PREFERRED EMBODIMENT

A metallic paint of a Fourth Preferred Embodiment was prepared in an identical manner with that of the Third Preferred Embodiment other than that a pigment which was coated with titanium by the sputtering in an amount of 2.0% by weight was used. This metallic paint was evaluated similarly, and the results of the tests are also summarized in Table 1. The paint film produced an intermediate color between white, which was similar to an aluminum metallic effect, and silver.

COMPARATIVE EXAMPLE 1

A metallic paint of a Comparative Example 1 was prepared in an identical manner with that of the Third Preferred Embodiment other than that the pearl mica pigment which was not subjected to the sputtering was used. This metallic paint was evaluated similarly, and the results of the tests are also summarized in Table 1.

COMPARATIVE EXAMPLE 2

A metallic paint of a Comparative Example 2 was prepared in an identical manner with that of the Third Preferred Embodiment other than that a pearl mica pigment on which silver was deposited in a scattering manner by electroless plating was used instead of the pigment of the First Preferred Embodiment. The thus deposited silver occupied 95% of the entire surface area of the $TiO_2$ layer in a projection area in total. This metallic paint was evaluated similarly, and the results of the tests are also summarized in Table 1.

TABLE 1

|  |  | 3rd Pref. Embodiment | 4th Pref. Embodiment | Comp. Ex. 1 | Comp. Ex. 2 |
|---|---|---|---|---|---|
| Titanium |  | 20 | 2.0 | 0 | Silver |
| (% by weight) |  |  |  |  |  |
| White Base | L* | 29.61 | 38.62 | 84.80 | 46.33 |
|  | a* | 2.66 | 9.36 | −0.20 | −0.85 |
|  | b* | 0.25 | 0.65 | 6.46 | −6.02 |
| Black Base | L* | 29.36 | 33.82 | 46.31 | 46.07 |
|  | a* | 2.69 | 13.63 | 18.34 | −1.14 |
|  | b* | 0.15 | −1.94 | −2.51 | −6.19 |
| Coverability |  | good | good to fair | bad | fair |
| Transparency |  | good | good | good | good |
| Metallic Glossy Effect |  | good | good to fair | bad | good |
| Flip-Flop Characteristic |  | good | good to fair | fair to bad | good |

Table 1 tells us that the metallic paints of the Third and Fourth Preferred Embodiments were superior to those of Comparative Examples 1 and 2 in the covering power, and that they had strong interference colors. It is apparent that these advantages were effected by forming the light absorbing portions and the metallic glossy portions on the surface of the $TiO_2$ layer of the pearl mica pigment in a scattering manner.

FIFTH PREFERRED EMBODIMENT

Figure 9:
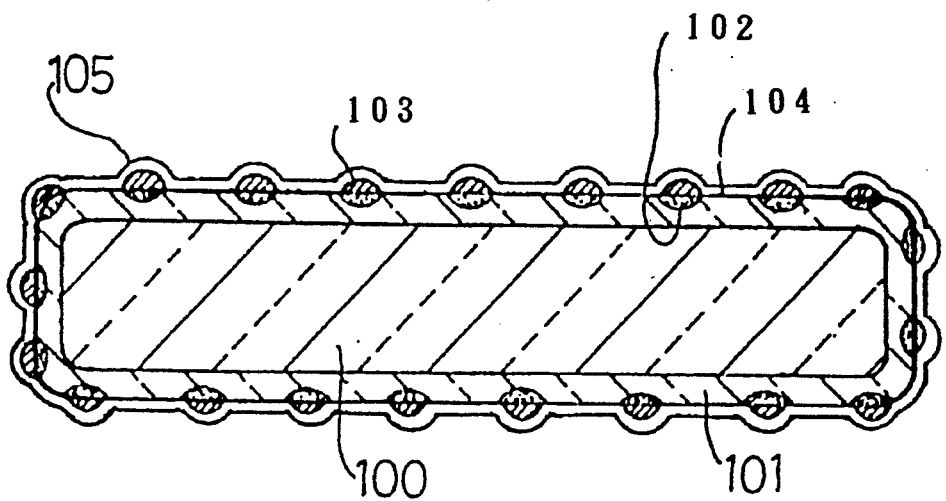
FIG. 9 is a schematic cross sectional view of a pigment of a Fifth Preferred Embodiment according to the present invention.
Figure 10:
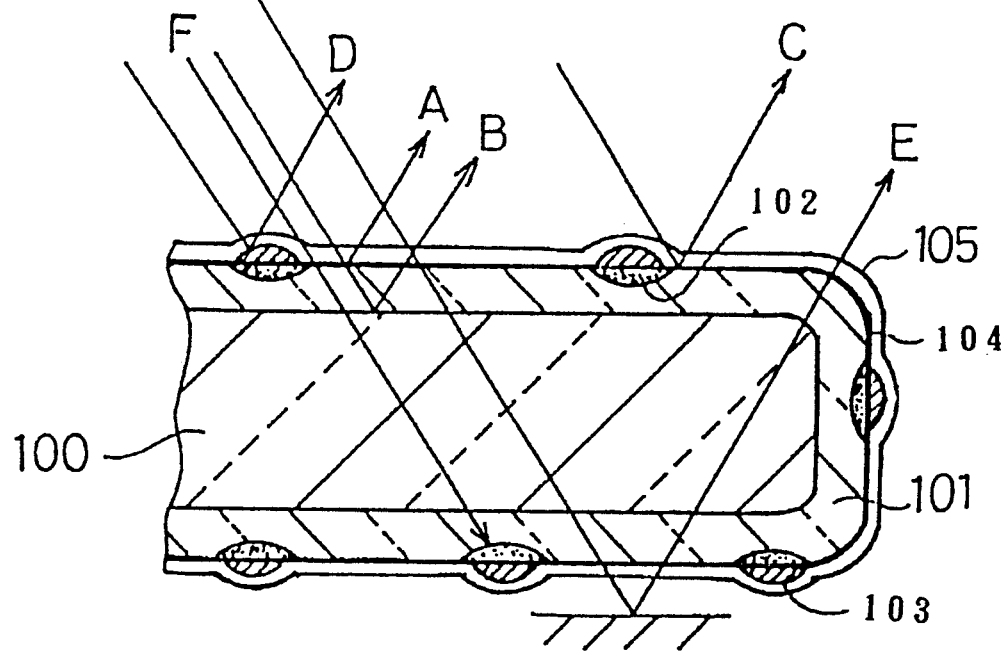
FIG. 10 is an enlarged schematic cross sectional view of the pigment of the Fifth Preferred Embodiment for explaining optical operations thereof.

FIGS. 9 and 10 are schematic cross sectional views of the pigment of the Fifth Preferred Embodiment according to the present invention. This pigment comprises a mica particle 100, a $TiO_2$ layer 101 coated on a surface of the mica particle 100, a chromium (III) hydroxide layer 104 formed on a surface of the $TiO_2$ layer 101, light absorbing portions 102 formed further on a surface of the $TiO_2$ layer 101 in a scattering manner and including low order oxides of titanium, glossy portions 103 formed on a surface of the light absorbing portions 102 and including metallic titanium, and a chromium (III) hydroxide layer 105 formed further on surfaces of the $TiO_2$ layer 101, the chromium (III) hydroxide layer 104 and glossy portions 103. The $TiO_2$ layer 101, the light absorbing portions 102 and the glossy portions 103 operate optically identically with those of the pigment of the First Preferred Embodiment. Hence, their operations will not be described herein. The chromium (III) hydroxide layers 104 and 105 which are present on the surface of the $TiO_2$ layer and the outermost surface of this pigment do not give a decorative effect optically. However, the chromium (III) hydroxide layers 104 and 105 improve the weather resistance of this pigment remarkably because they are present in the two-layered construction.

A production process for the pigment will be hereinafter described.

First Coating Step 90 grams of the same red pearl mica pigment which was obtained in the production step of pearl mica pigment in the First Preferred Embodiment was made into a slurry with 1,500 milliliters of distilled water. A pH of the slurry was adjusted to 6.0 by dripping a 2N sulfuric acid. Then, 116 milliliters of a 5% chromium chloride ($CrCl_3$) solution was diluted with 360 milliliters of distilled water, and this diluted solution was added to the above-described slurry at a constant rate for 30 minutes approximately. While adding this diluted chromium chloride ($CrCl_3$) solution to the slurry, the pH of the slurry was always kept at 6.0 by adding a 10% potassium hydroxide solution in required amounts.

After adding all of the diluted chromium chloride (CrCl$_3$) solution, the slurry was filtered and washed. The resulting precipitates were dried at a temperature of from 110° to 120° C. for 1 hour. Thus, the pearl mica pigment was coated with a chromium (III) hydroxide thin film in an amount of 4% by weight.

Formation of Light Absorbing Portions and Metallic Glossy Portions 93.6 grams of thus coated pearl mica pigment was subjected to the sputtering operation under the same conditions as set forth in the First Preferred Embodiment. Namely, when this step was completed, the pigment was coated with titanium in an amount of 20% by weight in total with respect to the weight of the pearl mica pigment.

Second Coating Step 117 grams of the thus obtained pigment was made into a slurry with 2,000 milliliters of distilled water. A pH of the slurry was adjusted to 6.0 by dripping a 2N sulfuric acid. Then, 151 milliliters of a 5% chromium chloride (CrCl$_3$) solution was diluted with 468 milliliters of distilled water, and this diluted solution was added to the above-described slurry at a constant rate for 30 minutes approximately. While adding this diluted chromium chloride (CrCl$_3$) solution to the slurry, the pH of the slurry was always kept at 6.0 by adding a 10% potassium hydroxide solution in required amounts.

After adding all of the diluted chromium chloride (CrCl$_3$) solution, the slurry was filtered and washed. The resulting precipitates were dried at a temperature of from 110° to 120° C. for 1 hour. Thus, the resulting pigment was further coated with a chromium (III) hydroxide thin film in an amount of 4% by weight. The thus obtained pigment produced an intermediate color between metallic grayish white and red.

The thus produced pigment was made into a metallic paint in the same manner as set forth in the Third Preferred Embodiment. This metallic paint was coated and made into a paint film in an identical manner with that of the Third Preferred Embodiment other than that it was coated on a test panel which was made of steel and which was undercoated with an epoxy resin paint in a thickness of 5 micrometers instead of the black and white covering power test paper used in the Third Preferred Embodiment.

Then, a QUV test was carried out onto the paint film for 1,000 hours. The results of the test are summarized in Table 2. In Table 2, the components amounts of the thin films were their respective calculated values in the pigments which had undergone their respective final treatments.

The 1,000-hour QUV test was conducted with a QUV testing apparatus. The QUV testing apparatus was operated at a temperature of 65° C. approximately with its ultraviolet lamps turned on for a 4-hour cycle, and then it was operated at a temperature of 50° C. approximately with its ultraviolet lamps turned off under a water or moisture condensing condition for a 4-hour cycle. These 2 cycles were repeated 3 times in 24 hours. Hence, the test panel coated with the metallic paint was exposed to a pseudo-high-temperature tropical day-time condition followed by a warm and high-moisture night-time condition. During the exposure, the moisture or water condensed on the test panel surface. When the test panel was wetted by the condensed moisture or water, the test panel was exposed to a ultraviolet light which intensifies as the cycles, during which the ultraviolet lamps turned on, were carried out repeatedly. Thus, the QUV test is based on the fact that the most of the polymer materials in the paint film, which are coated on the steel test panel, are adversely affected considerably when the influences of the high temperature, the high humidity and the ultraviolet irradiation are combined.

A plurality of the test panels which were coated with an identical metallic paint were placed in this QUV testing apparatus, and the test panels were taken out of the QUV testing apparatus one by one periodically to evaluate their appearance variations with a color difference meter and a glossimeter. The color differences between before and after the QUV test and the glossiness differences therebetween were taken as a color difference ($\Delta E$) and a glossiness holdability (%) respectively, and they are summarized in Table 2.

TABLE 2

|  |  | 5th Pref. Embodiment | 6th Pref. Embodiment | Comp. Ex. 3 | Comp. Ex. 4 | Comp. Ex. 5 |
|---|---|---|---|---|---|---|
| Components of Tin Films (% by weight) | TiO$_2$ | 34.2 | 43.1 | 36.8 | 35.3 | 35.3 |
|  | 1st Cr(OH)$_3$ Coating | 3.1 | 0.5 | 0 | 0 | 4.1 |
|  | Low Order Oxides of Ti by Sputtering | 6.7 | 2.2 | 4.6 | 4.4 | 4.4 |
|  | Metallic Ti by Sputtering | 14.7 | 0.5 | 12.6 | 12.1 | 12.1 |
|  | 2nd Cr(OH)$_3$ Coating | 4.0 | 0.5 | 0 | 4.1 | 0 |
| After 1,000-hr. QUV Test | Discoloration (Color Difference) | 0.2 | 0.3 | 5.8 | 3.6 | 2.1 |
|  | Glossiness (Holdability in %) | 91 | 88 | 20 | 35 | 50 |

SIXTH PREFERRED EMBODIMENT

A pigment of a Sixth Preferred Embodiment was prepared and made into a metallic paint in an identical manner with that of the Fifth Preferred Embodiment other than that the pigment was coated with titanium by the sputtering in an amount of 2.0% by weight and that the pigment was coated with the Cr(OH)$_3$ layer in an amount of 0.5% by weight in each of the first and second coating steps. This metallic paint was evaluated similarly, and the results of the tests are also summarized in Table 2. The paint film produced an intermediate color between red, which was similar to an aluminum metallic effect, and silver.

COMPARATIVE EXAMPLE 3

A pigment of a Comparative Example 3 was prepared and made into a metallic paint in an identical manner with that of the Fifth Preferred Embodiment other than that no Cr(OH)$_3$ layers were formed in both of the first and second coating steps. This metallic paint was evaluated similarly, and the results of the tests are also summarized in Table 2.

COMPARATIVE EXAMPLE 4

A pigment of a Comparative Example 4 was prepared and made into a metallic paint in an identical manner with that of the Fifth Preferred Embodiment other than that no Cr(OH)$_3$ layer was formed in the first coating step. This metallic paint was evaluated similarly, and the results of the tests are also summarized in Table 2.

COMPARATIVE EXAMPLE 4

A pigment of a Comparative Example 4 was prepared and made into a metallic paint in an identical manner with that of the Fifth Preferred Embodiment other than that no Cr(OH)$_3$ layer was formed in the second coating step. This metallic paint was evaluated similarly, and the results of the tests are also summarized in Table 2.

Table 2 tells us that, even after the 1000-hour QUV test, discoloration and decreased glossiness were hardly recognized in the test panels which were coated with the metallic paints comprising the pigments onto which the chromium (III) hydroxide treatments of the first and second coating steps were carried out repeatedly as set forth in the Fifth and Sixth Preferred Embodiments. Hence, it is apparent that these test panels exhibited superior weather resistances.

On the other hand, after the 1,000-hour QUV test, discoloration occurred considerably and the glossiness decreased sharply in the test panel which were coated with the metallic paint comprising the pigment of the Comparative Example 3 onto which no chromium (III) hydroxide treatments of the first and second coating steps were carried out, and in the test panel which were coated with the metallic paint comprising the pigment of Comparative Example 4 onto which only the chromium (III) hydroxide treatment of the second coating step was carried out, and in the test panel which were coated with the metallic paint comprising the pigment of the Comparative Example 5 onto which only the chromium (III) hydroxide treatment of the first coating step was carried out. In particular, degradation occurred extremely considerably in the test panel which were coated with the metallic paint comprising the pigment of the Comparative Example 3 onto which no chromium (III) hydroxide treatments were carried out. When comparing the degradations exhibited by the test panels coated with metallic paints comprising the pigments of the Comparative Examples 4 and 5, it is apparent that the first coating step contributed slightly more to the weather resistance improvement than the second coating step did.

Having now fully described the present invention, it will be apparent to one of ordinary skill in the art that many changes and modifications can be made thereto without departing from the spirit or scope of the present invention as set forth herein including the appended claims.

What is claimed is:

1. A pigment, comprising:
   a transparent or semi-transparent scaly substrate;
   a TiO$_2$ layer coated on an entire surface of said substrate;
   light absorbing portions formed on a surface of said TiO$_2$ layer in a scattering manner and including low order oxides of titanium; and
   glossy portions formed on a surface of said TiO$_2$ layer in a scattering manner and having a metallic glossy effect.

2. The pigment according to claim 1, wherein said substrate is at least one selected from the group consisting of mica, glass foil, molybdenum disulfide, Fe$_2$O$_3$ and MIO.

3. The pigment according to claim 2, wherein said substrate is mica.

4. The pigment according to claim 3, wherein said mica is at least one selected from the group consisting of natural mica, and synthetic mica.

5. The pigment according to claim 1, wherein said substrate has a length of from 1 to 75 micrometers and a thickness of from 0.03 to 0.3 micrometers.

6. The pigment according to claim 5, wherein said substrate has a length of from 5 to 40 micrometers and a thickness of from 0.10 to 1.0 micrometers.

7. The pigment according to claim 5, wherein said substrate has a specific surface of from 1 to 10 m$^2$/g which is determined by the BET equation.

8. The pigment according to claim 7, wherein said substrate has a specific surface area of from 2 to 6 m$^2$/g which is determined by the BET equation.

9. The pigment according to claim 1, wherein said light absorbing portions and said glossy portions are formed so as to occupy from 0.03 to 98% of said entire surface area of said TiO$_2$ layer in a total projection area on said TiO$_2$ layer.

10. The pigment according to claim 1, wherein said pigment further comprises a layer which coats said TiO$_2$ layer, said light absorbing portions and said glossy portions, and which includes chromium (III) hydroxide at least.

11. A process for producing a pigment, comprising the steps of:
    supplying a pigment which comprises a transparent or semitransparent scaly substrate coated with a TiO$_2$ layer under a decompression and heating condition; and
    coating said pigment with metallic titanium in a scattering manner by sputtering, thereby reducing part of said TiO$_2$ layer to low order oxides of titanium.

12. The process according to claim 11, wherein said sputtering is carried out at a temperature of 200° C. or less in said coating step.

13. The process according to claim 11, wherein said steps are carried out by circulating said pigment through a powder decompression and heating treatment station, a fluidized bed sputtering station and a fluid mill powder dispersing treatment station, thereby carrying out said metallic titanium coating by sputtering repeatedly.

14. The process according to claim 11, wherein said metallic titanium is sputtered in an amount of from 1 to 30% by weight with respect to said pigment in said coating step.

15. The process according to claim 14, wherein said metallic titanium is sputtered in an amount of from 2 to 20% by weight with respect to said pigment in said coating step.

16. A metallic paint, comprising:
    a pigment which includes:

a transparent or semi-transparent scaly substrate;

a TiO$_2$ layer coated on an entire surface of said substrate;

light absorbing portions formed on a surface of said TiO$_2$ layer in a scattering manner and including low order oxides of titanium; and glossy portions formed on a surface of said TiO$_2$ layer in a scattering manner and having a metallic glossy effect.

17. The metallic paint according to claim 16, wherein said metallic paint includes said pigment in an amount of from 1 to 20 parts by weight with respect to 100 parts by weight of solid components therein.

18. A process for producing a weather resistant pigment, comprising the steps of:

a first coating step of coating a surface of a transparent or semi-transparent scaly substrate with chromium (III) hydroxide, the substrate coated with a semi-transparent layer which includes rutile TiO$_2$ mainly;

a step of forming low order oxides of titanium and metallic titanium on a resulting substrate in a scattering manner; and a second coating step of coating a surface of a resulting substrate with chromium (III) hydroxide.

19. The process according to claim 18, wherein said substrates are made into a slurry in a concentration of from 5 to 15% by weight, and a pH of a resulting slurry is kept in a range of from 5.5 to 6.5 in said first and second coating steps.

20. The process according to claim 19, wherein a chromium (III) compound solution is added to said slurry at a constant speed for from 0.1 to 2.0 hours while keeping a pH of said slurry at 6.0 in said first and second coating steps.

21. The process according to claim 20, wherein said chromium (III) compound solution is added to said slurry at a constant speed for from 0.25 to 0.75 hours.

22. The process according to claim 20, wherein said chromium (III) compound solution is added to said slurry in an amount of from 0.2 to 1.0% by weight as chromium with respect to a total amount of said substrate.

23. The process according to claim 22, wherein said chromium (III) compound solution is added to said slurry in an amount of from 0.3 to 0.6% by weight as chromium with respect to a total amount of said substrate.

24. The process according to claim 18, wherein said chromium (III) hydroxide is made from a chromium (III) compound in said first and second coating steps.

25. The process according to claim 24, wherein said chromium (III) compound is added to a suspension which contains said substrates and at least one of hydroxyl ions and phosphate ions.

26. The process according to claim 24, wherein said chromium (III) compound and at least one of hydroxyl ions and phosphate ions are added simultaneously to a suspension which contains said substrates while keeping a pH of the suspension at a predetermined value.

27. The process according to claim 18, wherein said chromium (III) hydroxide is made from a chromium (IV) compound in said first and second coating steps.

28. The process according to claim 27, wherein said chromium (III) hydroxide is formed by admixing a chromium (IV) compound solution and a reducing agent to a suspension which contains said substrates one by one.

29. The process according to claim 27, wherein said chromium (III) hydroxide is formed by admixing a chromium (IV) compound solution and a reducing agent to a suspension which contains said substrates slowly at the same time.

30. The process according to claim 18, wherein said substrates are made into a suspension, and a pH of the suspension is kept at 3.0 or more in said first and second coating steps.

31. The process according to claim 30, wherein said pH of said suspension is kept in a range of from 4.5 to 9.0.

32. The process according to claim 18, wherein said chromium (III) hydroxide is made from at least one selected from the group consisting of CrCl$_3$, a chromium aluminate solution and potassium dichromate in said first and second coating steps.

33. The process according to claim 18, wherein said chromium (III) hydroxide is made from chromium (III) phosphate in said first and second coating steps.

34. The process according to claim 33, wherein said chromium (III) phosphate is made from at least one selected from the group consisting of orthophosphoric acid, and polymerized phosphate.

35. The process according to claim 34, wherein said chromium (III) phosphate is made from at least one selected from the group consisting of KH$_2$PO$_4$, NaH$_2$PO$_4$.12H$_2$O, Na$_3$PO$_4$.12H$_2$O, Na$_4$P$_2$O$_7$.7H$_2$O and (NaPO$_3$)$_x$.

36. The process according to claim 18, wherein said chromium (III) hydroxide is further treated with a solution containing phosphate so as to convert it to a chromium (III) phosphate partially or entirely in said first and second coating steps.

37. The process according to claim 18, wherein said substrate is coated with said chromium (III) hydroxide in an amount of from 0.2 to 3% by weight which is calculated as a Cr$_2$O$_3$ weight with respect to a total weight of said substrate in said first and second coating steps.

* * * * *